T. M. LILLISTON.
SAW FOR STEMMING PEANUTS.
APPLICATION FILED AUG. 13, 1915.
1,175,000.
Patented Mar. 14, 1916.
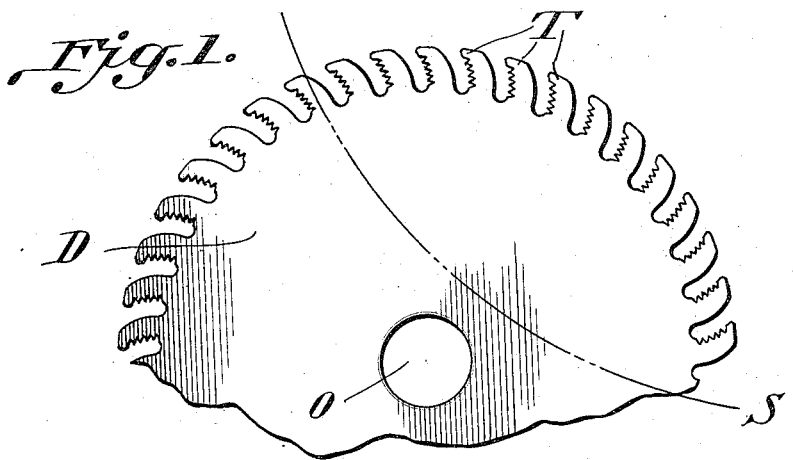
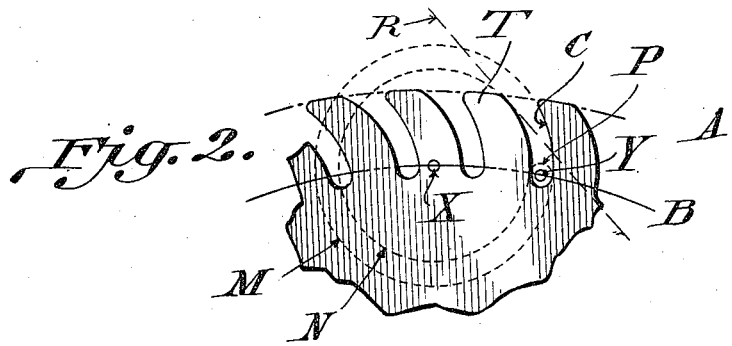
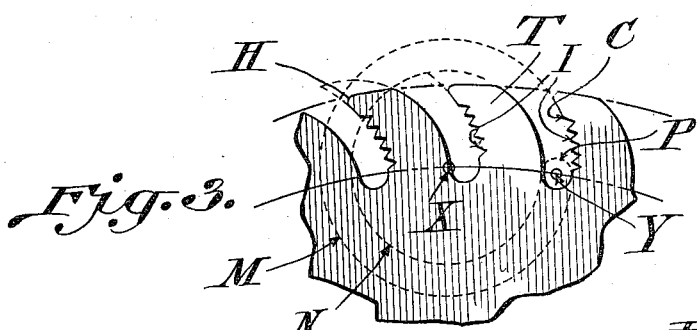
Inventor:
Thomas M. Lilliston
By George W. Ramsey,
atty.

UNITED STATES PATENT OFFICE.

THOMAS M. LILLISTON, OF SUFFOLK, VIRGINIA.

SAW FOR STEMMING PEANUTS.

1,175,000.  Specification of Letters Patent.  Patented Mar. 14, 1916.

Application filed August 13, 1915. Serial No. 45,357.

*To all whom it may concern:*

Be it known that I, THOMAS M. LILLISTON, a citizen of the United States, and a resident of the city of Suffolk, in the county of Nansemond, State of Virginia, have invented certain new and useful Improvements in Saws for Stemming Peanuts, of which the following is a specification.

This invention relates broadly to the art of threshing and more particularly to a saw designed for stemming peanuts.

The principal object of this invention is to produce a saw or disk for the purposes specified wherein there is no wedging action in the spaces between the teeth.

Another object of the present invention is the production of a saw for the purpose set forth, wherein the front edges of the teeth are curved and the edges of the adjacent teeth are spaced a uniform distance apart throughout their length to avoid any wedging action taking place in the spaces between the teeth.

A further and primary object of this invention is the construction of a saw or disk for stemming peanuts wherein the spaces between the teeth are of a uniform width throughout and are preferably less than the width of the teeth at the base thereof.

A still further and primary object of this invention is the production of a saw for the purpose specified having a curved tapering tooth wherein there is no wedging action in the spaces between the teeth since the spaces between the teeth are of a uniform width throughout their entire length, and wherein the effective advancing edge of the tooth is serrated.

A still further and important object of the present invention is the production of a saw or disk of the character specified wherein the contour of the edges of the spaces between the teeth comprises sectors of concentric curves with the ends of the teeth co-incident with the periphery of the saw and the points rounded so that the teeth will not catch any substance that does not enter within the space between the teeth.

Other and further objects of this invention will in part be obvious and will in part be pointed out hereinafter by reference to the drawings which form a part of this said specification.

Throughout the several figures of the drawings the same characters are used to represent like parts and constructions.

Figure 1 is a detail view of a part of one of the saws constructed in accordance with my invention. Fig. 2 is a detail view illustrating the construction of the teeth of a saw in accordance with my invention. Fig. 3 is a detail view illustrating the construction of a larger tooth with the same length of tooth as illustrated in Fig. 2 but with a larger space between the adjacent teeth.

It is common in the peanut industry to use various kinds of saws for the purpose of removing stems from peanuts. Some special types of saws have been produced wherein the edges of the adjacent teeth meet at an acute angle for the stated purpose that the stems when engaged by the throat will be drawn to the bottom thereof and the gradual narrowing of the throat exerts a wedging action on the stem, to thereby securely wedge the stem while it is being pulled from the peanut. I have found that a more efficient saw is obtained where there is no wedging action whatever between the edges of the adjacent teeth; since where the spaces between the teeth are in a converging relation and meet at an acute angle, it frequently happens that particles become wedged within the teeth to such an extent as to substantially fill the teeth and prevent efficient and effectual operation of the saw, at the same time impose an unnecessary load on the action of the saw because of the resistance of the wedged particles as they are carried through a mass of peanuts.

The saw comprising my invention is formed of teeth wherein the sides of the adjacent teeth are uniformly spaced apart throughout their entire length and comprise sections of concentric curves, preferably circles. This construction is of especial advantage in that as the saws revolve the teeth coming up through the mass of unstemmed peanuts are curved to receive and engage peanut stems in a manner that is not possible with a straight edged tooth, and after the stem or fiber is looped over the tooth and pulled through the wall of a peanut stemmer, which I prefer shall be circular, (as shown in patent to Lilliston #1,103,305, July 14, 1914,) the stems or fibers are free to drop from the teeth at a point which is earlier in the rotation of the saw than would occur with straight pointed teeth. Since peanut stems are relatively flexible, they readily loop themselves over the advancing edge of the tooth, and to more securely hold the stems I prefer that the breast of the teeth be serrated to engage and pull the stem from its point of attachment to the nut without breaking the stem itself. In a construction wherein the spaces between the teeth are of a constant width there is no possibility of the stems being wedged and hence carried back through the mass of peanuts a second time. By constructing the teeth in such manner that the sides of adjacent teeth are portions of concentric circles, it will be noted that the teeth themselves are of a gradually tapering construction which would not be possible of attainment with straight edges wherein the straight edges are parallel. In constructions using continuous straight parallel lines for the side edges of the gullets, the outer portion of the teeth is always wider than the base which makes an over-balanced and usually weak construction. The form of teeth illustrated are all generated by circles, but other forms of curves may be used, the curve lines being immaterial so long as the spaces between the teeth are of uniform width and the teeth are tapering from the base to the point.

Referring now more particularly to the drawings and especially to Figs. 2 and 3, the curved line A in both figures represents the periphery of the saw or the line representing the extreme outer portion of the teeth. The curved line B comprising a part of a circle, represents a line passing through the widest portion or base of the teeth, and is the line upon which the teeth are generated, as will now be explained. From a point X on the line B, the circle N is struck, which circle is inclined to the circle A and intersects the circle B at right angles. From this same point X as a center a larger circle M is formed thereby forming concentric circles, which by their very definition are uniformly spaced apart throughout their entirety, and the portion of the larger circle M which extends from the line B substantially to the line A comprises the contour of the advancing edges or breasts C of the teeth. It is to be noted that both circles M and N intersect the circle B at right angles thereby making a pulling portion perpendicular to the travel of the teeth and hence most effective to carry out the function of pulling. Also it is to be noted that a tangent R to the circle N at its intersection with the circle A is angular thereto, thus presenting an advancing edge that is most efficient to enter the mass of peanuts. From a point Y on the line B and exactly midway between the two circles M and N, a small circle P is formed and the sections of circles M and N are joined by a portion of the smaller circle P. The operation described is repeated, each time forming throats of uniform width at predetermined intervals thereby creating the teeth T which are the effective part of the saw. Preferably the points of the teeth as at H are rounded to prevent a cutting action and to enable the teeth to be operative as a pulling device, which is the function of a peanut stemming saw.

Beginning immediately below the rounded points H, the breasts of the teeth are preferably notched or serrated as at I in order to prevent any tendency that the stems might have to slip from the edge of the tooth. In Fig. 2, however, I have illustrated the teeth as being plane and this form more clearly shows the general principles on which the teeth are generated.

Fig. 1 shows a larger portion of the saw or disk D having the teeth T upon its periphery and illustrates the relation of the saw to the wall S of one form of peanut stemmer, as well as showing the shaft opening O.

Having thus described my invention what I claim is:—

1. As an article of manufacture, a saw for the purpose specified comprising a disk provided on its periphery with a plurality of teeth, said teeth being of a gradually diminishing cross section from the base to the point thereof, the sides of adjacent teeth forming the gullet between the teeth lying in substantially parallel curves, the outer extremities of the teeth being relatively wide and lying substantially in a common circle, the advancing points of the teeth being rounded, relatively smooth portions extending inwardly from said points, and serrations in the breasts of the teeth between said smooth portions and the bottom of the gullets.

2. As an article of manufacture a saw of the character specified comprising, a disk provided on its periphery with a plurality of teeth, the edges of the adjacent teeth being formed on substantially concentric circles whereby the walls of a gullet between adjacent teeth are substantially parallel, the common center for said concentric circles being located relative to the center of the disk so that radii of the disk are substantially tangent to the walls of the gullets at the base of the teeth, the outer extremities of the teeth lying in a common circle, and the advancing ends of the teeth being rounded.

3. As an article of manufacture, a saw of the character specified comprising, a disk provided on its periphery with a series of relatively long slender teeth, said teeth being tapering in cross section from the base to the ends thereof, the side walls of the adjacent teeth forming the gullets between the teeth lying in parallel curves and arranged substantially tangent to radii of the disk at the base of the teeth, the outer extremities of the teeth lying in a common circle, the breasts of the teeth adjacent the ends being substantially smooth and the breasts of the teeth being serrated below said smooth portion.

THOMAS M. LILLISTON.